(12) United States Patent
Caulfield

(10) Patent No.: US 6,767,461 B1
(45) Date of Patent: Jul. 27, 2004

(54) SEPARATOR

(75) Inventor: Richard Caulfield, Banjup (AU)

(73) Assignee: Environmental Separation Technologies PTY LTD (AU)

( * ) Notice: Subject to any disclaimer, the term of this patent is extended or adjusted under 35 U.S.C. 154(b) by 0 days.

(21) Appl. No.: 09/937,307

(22) PCT Filed: Mar. 24, 2000

(86) PCT No.: PCT/AU00/00248

§ 371 (c)(1),
(2), (4) Date: Sep. 24, 2001

(87) PCT Pub. No.: WO00/56420

PCT Pub. Date: Sep. 28, 2000

(30) Foreign Application Priority Data

Mar. 24, 1999 (AU) ............................................. PP 9419
Nov. 26, 1999 (AU) ............................................. PQ 4306

(51) Int. Cl.⁷ ............................. B01D 21/26; B63H 5/10
(52) U.S. Cl. .................... 210/512.3; 210/295; 210/304; 440/82; 384/398; 494/53; 494/54; 494/56; 494/58
(58) Field of Search ............................. 440/82, 83, 112; 384/398; 210/295, 304, 512.3; 494/53, 54, 56, 57, 58

(56) References Cited

U.S. PATENT DOCUMENTS

| | | |
|---|---|---|
| 3,177,841 A | 4/1965 | Galuska |
| 3,782,623 A | 1/1974 | Bye-Jorgensen et al. |
| 4,448,688 A | 5/1984 | Havlis |
| 4,790,806 A | 12/1988 | High ............................. 494/26 |
| 5,234,400 A | 8/1993 | Kluge ........................... 494/54 |
| 5,582,528 A | 12/1996 | Rafferty et al. ............... 440/82 |

FOREIGN PATENT DOCUMENTS

| | | |
|---|---|---|
| DE | 28 10 306 A1 | 10/1978 |
| EP | 0 037 347 A1 | 10/1981 |
| WO | WO 93/11847 | 6/1993 |
| WO | WO 95/33572 | 12/1995 |

OTHER PUBLICATIONS

Supplementary European Search Report.
International Search Report.

*Primary Examiner*—David A Reifsnyder
(74) *Attorney, Agent, or Firm*—Blank Rome LLP

(57) ABSTRACT

A separator for separating particles entrained in a fluid is disclosed. The separator includes a sleeve adapted to be mounted over a rotatable shaft for forming a cavity therebetween, an inlet to the cavity, an outlet to the cavity and means for imparting a centrifugal force on fluid within the cavity. The means for imparting the centrifugal force is operatively connected to the shaft so that, in use, spinning of the shaft creates the centrifugal force. In use, a slurry of fluid and particles enters the cavity through the inlet, the particles are caused to separate from the fluid by action of the centrifugal force, and the separated particles and fluid leave the cavity via the outlet with the particles tending to be closer to the sleeve than the shaft.

31 Claims, 8 Drawing Sheets

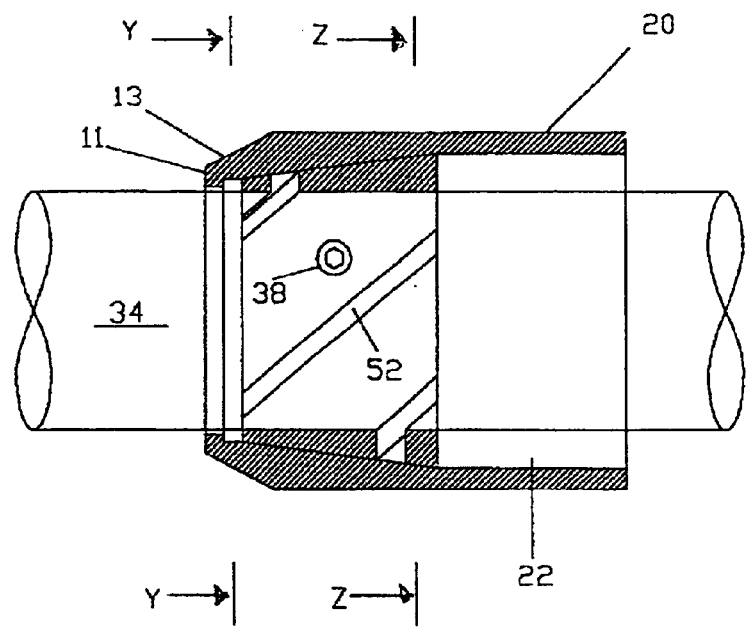
FIG.5
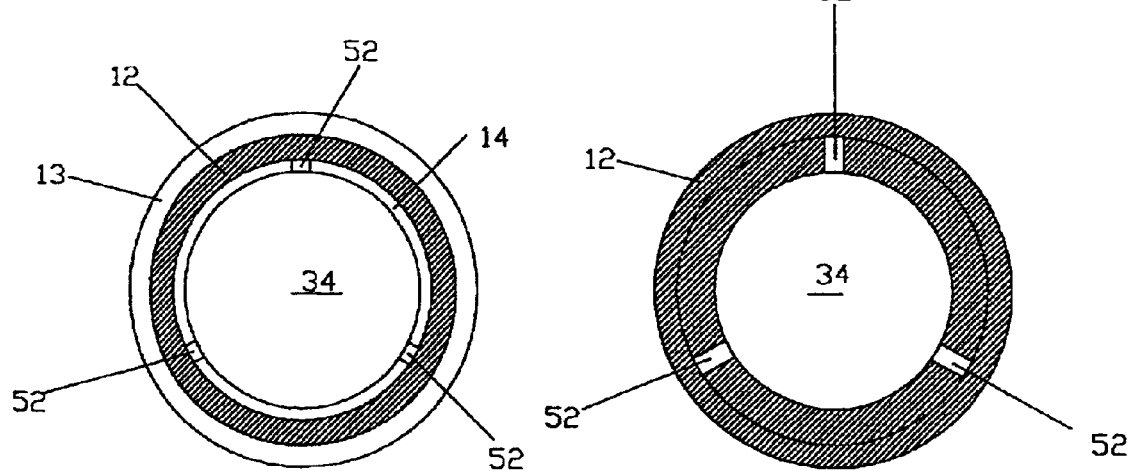
FIG.6A
FIG.6B

SEPARATOR

FIELD OF THE INVENTION

The present invention relates to a separate for separating particles from a fluid.

BACKGROUND

In many marine craft, a propeller at the end of a drive shaft extends away from the craft's stem by out rigging via a bearing. The bearing is usually cooled and lubricated by water flowing through channels or grooves which extend through the bearing. When the marine vessel passes through water where sand or grit has been disturbed, the sand/grit particles can find their way into the lubricating grooves of the bearing. These particles are highly abrasive to the bearing, and result in the bearing quickly becoming worn.

There is therefore a need to minimise the amount of sand or other abrasive particles from entering the lubricating grooves of the bearing.

SUMMARY OF THE INVENTION

An object of the present invention is to provide a separator for separating particles entrained in a fluid.

In accordance with a first aspect of the present invention there is provided a separator for separating particles entrained in a fluid, said separator including:

a sleeve adapted to be mounted over a rotatable shaft for forming a cavity therebetween;

an inlet to the cavity;

an outlet to the cavity opposite the inlet; and means for imparting a centrifugal force on fluid within the cavity, said means operatively connected to the shaft so that, in use, spinning of the shaft creates the centrifugal force, wherein, in use, a slurry of fluid and particles enters of the cavity through the inlet, the particles are caused to separate from the fluid by action of the centrifugal force, the separated particles and fluid leave the cavity via the outlet with the particles tending to be closer to the sleeve than the shaft.

Preferably, the cavity increases in cross-sectional area along its length from the length towards the outlet.

In a first embodiment, the sleeve is frustoconical in shape with the narrow end of the cone at the inlet and the wide end at the outlet, whereby the size of the cavity increases along its length from the inlet to the outlet, which causes the movement of the slurry through the cavity to slow the further it progresses along the length of the separator, thereby increasing the centrifugal action on the fluid as it moves along the length of the separator.

In the first embodiment, the means for imparting a centrifugal force is in the form of one or more paddles projecting from the shaft into the cavity, the paddles causing the fluid to rotate about the longitudinal axis of the shaft as the shaft spins.

In a second embodiment, the cavity is of a helical shape. The helix shaped cavity, acting as said means so that as it is rotated, the centrifugal force is imparted on the fluid in the cavity. Preferably, the helical shape assists in moving fluid through the cavity from the inlet to the outlet. More preferably, there is a plurality of helical shaped cavities. Preferably, there is provided a first raceway between the inlet and the helical cavities.

Preferably, the inlet is of a smaller area than the outlet and thereby limiting the amount of fluid that enters the cavity.

Preferably, the outlet includes a parting means arranged to portion an inner layer of fluid substantially devoid of the particles from an outer layer of the fluid carrying the particles. More preferably, the parting means is in the form of a blade closely encircling the shaft. Preferably, the outlet includes a chamber at the outlet end of the cavity between the sleeve and the shaft, the chamber arranged to receive a parting means for portioning an inner layer of fluid substantially devoid of the particles from an outer layer of fluid carrying the particles.

Preferably, the sleeve is arranged to rotate about its axis relative to the parting means.

Preferably, the outer layer is ejected from a first exist of the outlet. Preferably, the parting means includes a turbulence means for slowing the exit of the fluid carrying the particles from the outlet.

Preferably, the parting means is arranged to be fixed to a bearing.

Preferably, the parting means includes a scoop means for scooping the inner layer of fluid away from the blade to a second exit of the outlet.

Preferably, the scoop means is in the form of a plurality of curved channels. Preferably, the scoop means is provided with a second raceway between the curved channels and the second exit.

According to a second aspect of the present invention, there is provided a separator and parting means combination, the separating means as defined above and the parting means is arranged to partition an inner layer of fluid substantially devoid at particles from an outer layer of fluid carrying the particles.

According to a third aspect of the present invention, there is provided a separator, parting means and a bearing combination, the separator and parting means as defined above, the bearing arranged to receive the inner layer of fluid from the parting means.

DETAILED DESCRIPTION OF PREFERRED EMBODIMENTS

In order to provide a better understanding, preferred embodiments of the present invention will now be described in detail, by way of example only, with reference to the accompanying diagrams in which:

FIG. 5 is a cross sectional side view of the separator of FIG. 4;

FIG. 6A is a complete cross sectional end view of the separator as would bee seen from the second Y—Y of FIG. 5;

FIG. 6B is a complete cross sectional end view of the separator as would bee seen from the section Z—Z of FIG. 5;

Figure 1:
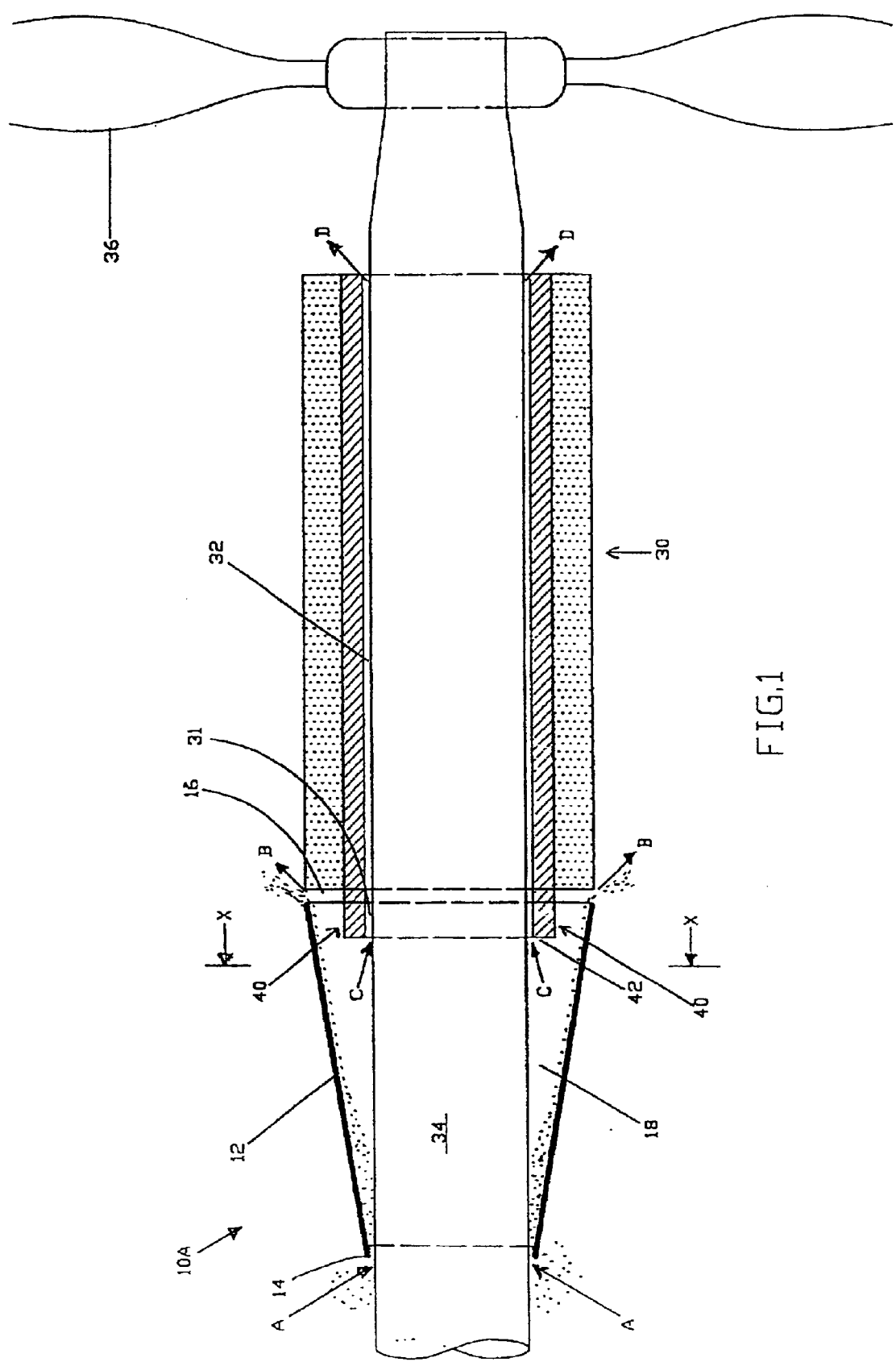
FIG. 1 is a cross sectional side view of a separator in accordance with the present invention.

Referring to FIG. 1, there is provided a separator 10A which includes a sleeve 12. The sleeve 12 is fixed to a propeller shaft 34. An outer wall of the sleeve 12 defines a cavity 18 between the outer wall and the shaft 34. The cavity has an inlet 14 at one end and an outlet 16 at another end. The outer wall is of a frustoconical shape with the narrow end of the cone at the inlet 14 and the wide end at the outlet 16. The inlet 14 is of less area than the outlet 16. The inlet 14 is a size to allow a desired amount of a slurry of water and particles to enter the cavity 18. The outlet 16 is of a size so that separated sand particles may be layered circumferentially on the separated water so that the separated water is adjacent a lubricating groove entry 31 of a propeller shaft bearing 30.

The separator is spaced a short distant before a bearing 30 on the shaft 34. The distance may be, for example, about 1 mm. The spacing allows the sand particles to be laterally ejected from the outlet 16 as indicated by B.

Figure 2:
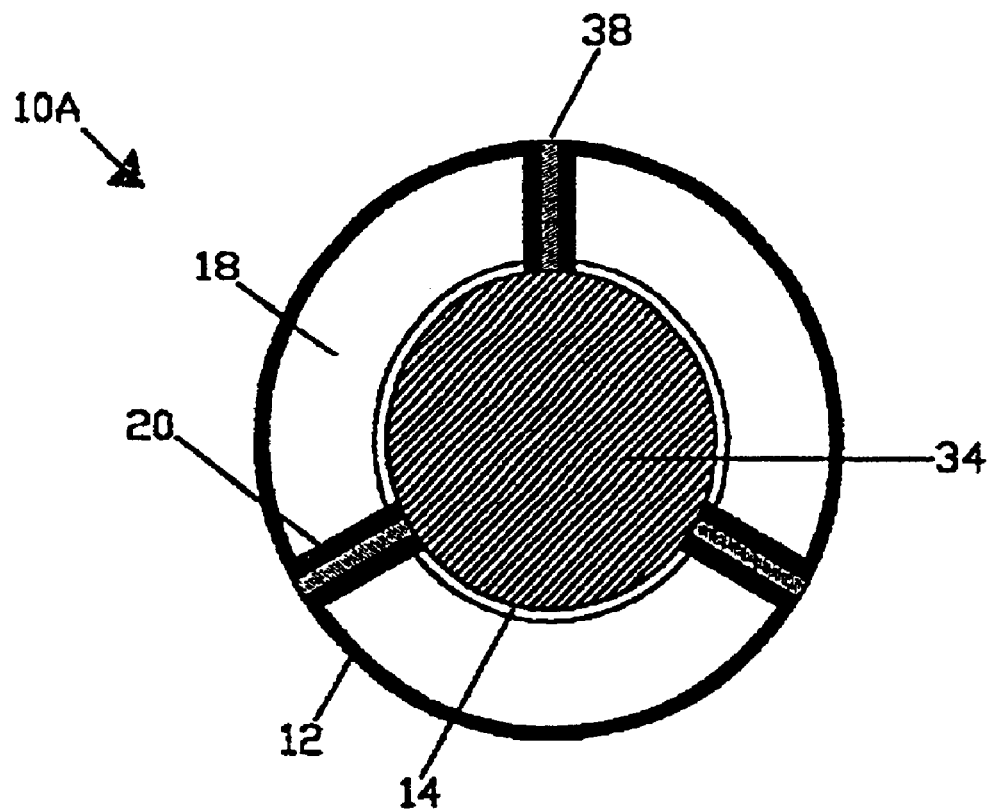
FIG. 2 is a complete cross sectional end view of the separator as would be seen from the section X—X of FIG. 1.

Referring to FIG. 2, the separator 10A includes one or more paddles or veins 20 that project from the shaft 34. The veins may also allow the sleeve 12 to be fixed to the shaft 34 by, for example, receiving grub screws 38. In this example, there are three veins, however any suitable number of veins may be used.

Figure 3:
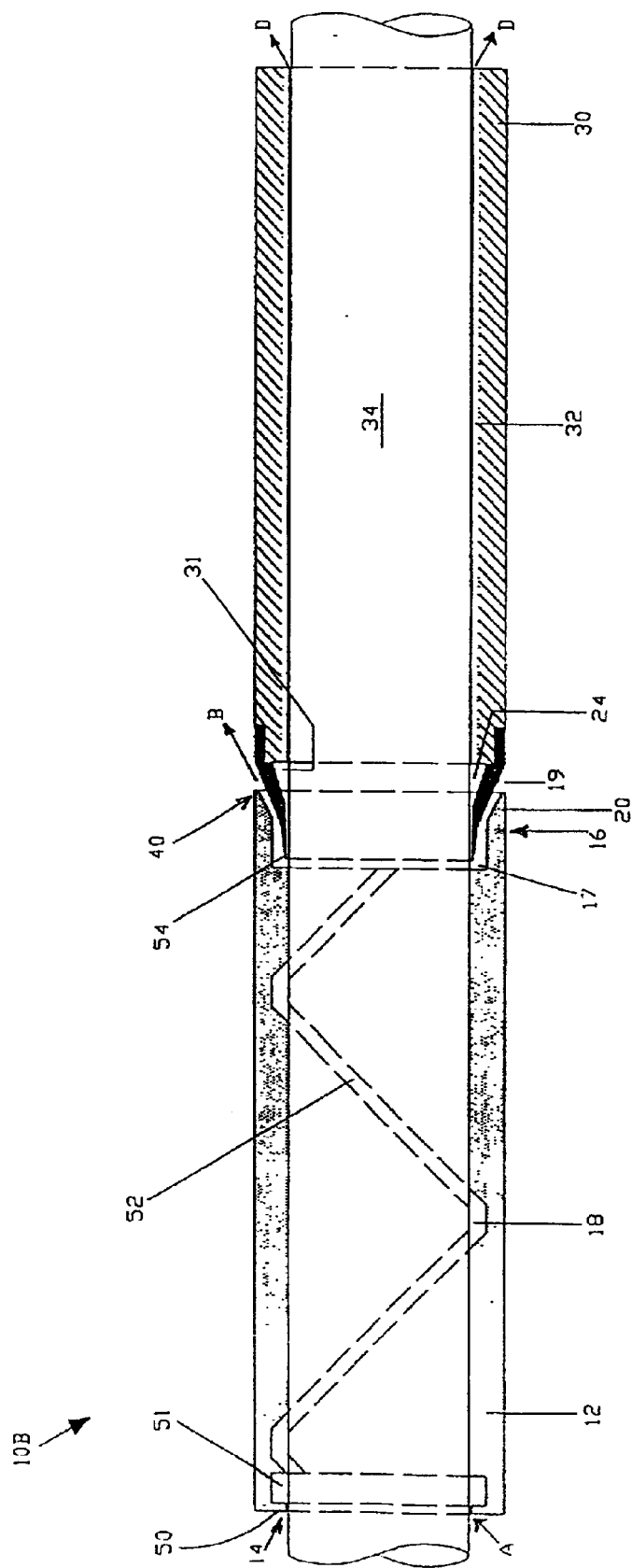
FIG. 3 is a cross sectional side view of another embodiment of a separator in accordance with the present invention.

Referring to FIG. 3, this embodiment of the separator 10B includes a cylindrical sleeve 12 fixed to the propeller shaft 34. In this case the cavity 18 is in the form of at least one helix shaped channel 52. More that one channel may be used, such as three or four, but only one is shown in the diagram for convenience. The inlet 14 is in the form of a raceway having an inwardly directed projection 50. Only a small gap is provided between the projection 50 and the shaft 34. This is to limit the size of the particles entering the separator 10 and to limit the intake of fluid. The raceway may be detachable from the rest of the separator. After the gap, there is a circular cavity 51 that allows the fluid to flow freely before entry into the channel 52. The channel 52 widens slightly along its length so that there is minimal risk of particles becoming stuck in the channel and so that the flow rate of the fluid decreases. For convenience, the widening in the channel is not shown in the diagram.

An overhanging extension 20 of the sleeve 12 provides an outlet chamber 17 which forms part of the outlet 16. Within the outlet chamber 17 there is provided a collector 40 in the form of a blade 54 that surrounds the shaft 34 to portion the separated "clean" fluid from fluid still carrying the particles. In this application only a small amount of fluid is required to lubricate the bearing 30, therefore only a small amount of clearance is required between the blade 54 and the shaft 34. However this may vary for other applications. The partitioning of the outlet 16 by the collector 40 provides a means of "peeling" off the inside "clean" fluid which exists the separator through a clean fluid exit 24 of the outlet 16. Meanwhile the remaining fluid and particles are ejected out of a particle ejection slit 19 of the outlet 16.

Figure 4:
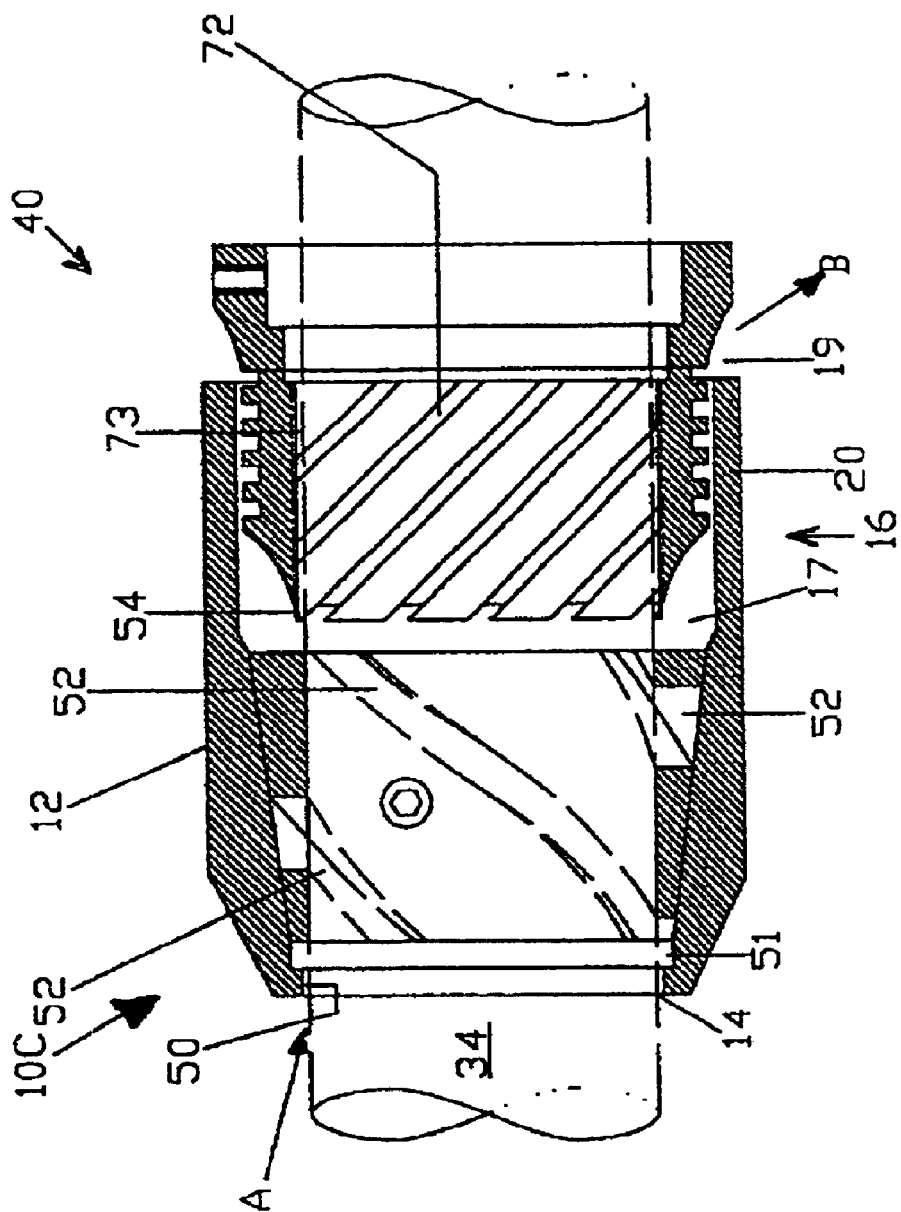
FIG. 4 is a cross sectional side view of yet another embodiment of a separator in accordance with the present invention.

Referring to FIG. 4, in this embodiment of the separator 10C, the sleeve 12 is shorter in length than in the embodiment of FIG. 3 and has three channels 52. The extension 20 is longer to accommodate a more sophisticated from of the collector 40. The shaft 34 is shown in phantom. In this embodiment, the collection 40 is longer and includes a plurality of grooves 72.

FIG. 5 shows the separator 10C without the collector 40. At the front 11 of the separator the sleeve 12 is chamfered (at 13) to assist in streamlining. FIGS. 6A and 6B show the height of the three channels 52 increase along the length of the sleeve 12 so that the area of the channels 52 correspondingly increase along the length of the sleeve 12.

Figure 7:
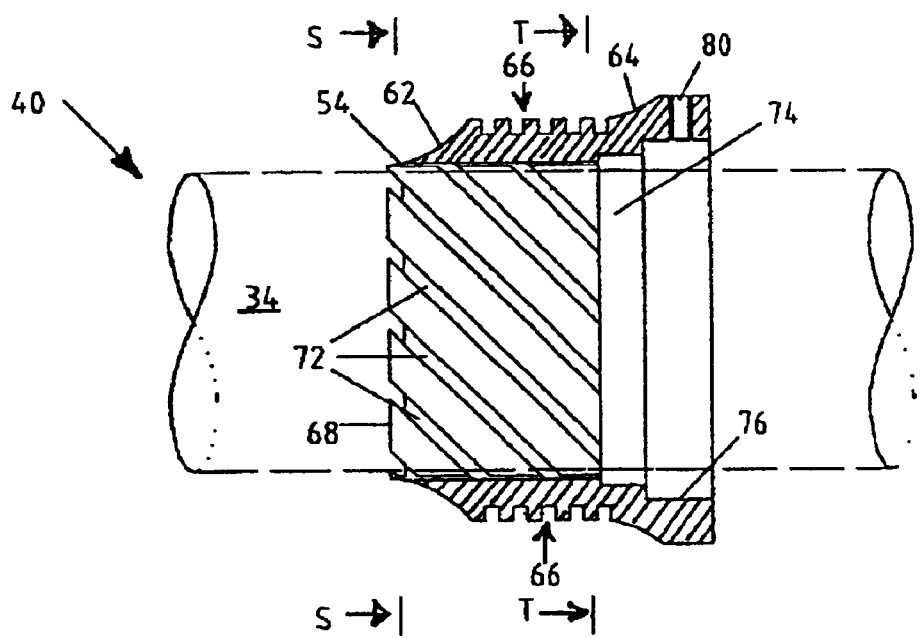
FIG. 7 is a cross sectional side view of a bladed portion of a collector of FIG. 5.

FIG. 7 shows the collector 40 of FIG. 5 in isolation. The grooves 72 extend from the edge 68 of the blade 54 to a raceway 74. The raceway 74 distributes "clean" fluid that has passed through the grooves 72 so that it may enter the bearing which fits within a collar section 76. The collar section 76 is fixed to the bearing 32 by a grub screw 80.

The collector 40 is fixed to the bearing 32 and thus does not spin with the shaft 34 and sleeve 12. The orbiting fluid is more easily scooped when the direction of rotation of the helical shaped grooves 72 are opposite to the direction of rotation of the channels 52. Where the blade 54 narrows to a thickness equal to the height of the grooves 72. The grooves 72 create gaps in the blade 54. The parts of blade between the gaps are finger-like. These fingers further assist is scooping the "clean" fluid into the grooves 72. A curved surface 62 of the blade 54 extending away from the blade edge 68 parts the particles from the "clean" fluid.

Due to the shaft 34 spinning inside the collector 40, adequate clearance 73 is required between the inner surface of the collector 40 and the shaft 34. It is however, envisaged that in some applications the collector 40 may be fixed to the shaft 34 rather than the bearing 30. In this case, the grooves 72 are preferably in the same direction as the channels 52.

Figures 8A, 8B:
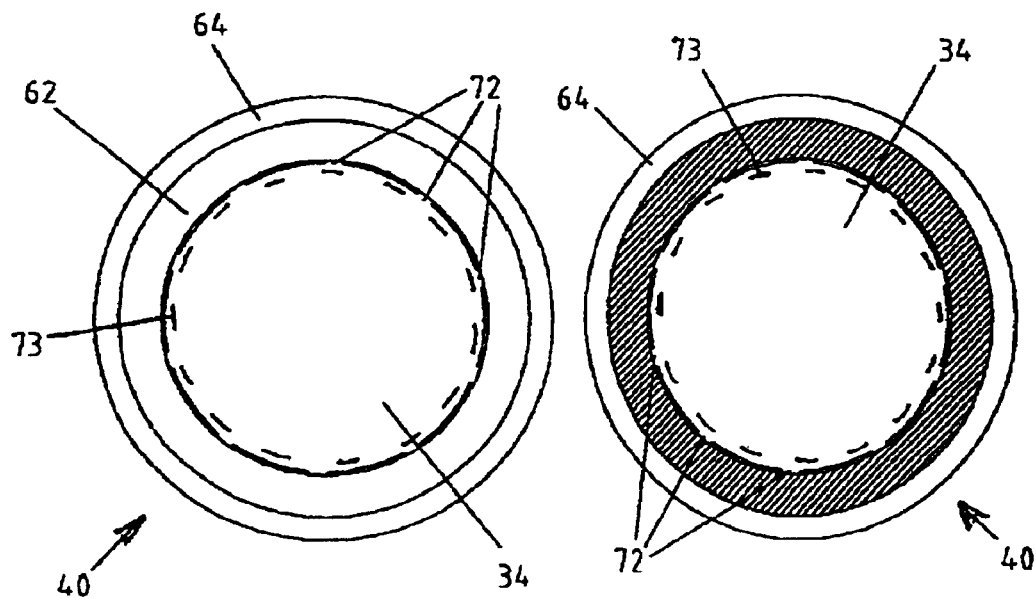
FIG. 8A is a complete cross sectional end of view of the collector as would be seen from the second S—S of FIG. 7.
FIG. 8B is a complete cross sectional end view of the collector as would be seen from the section T—T of FIG. 5.

FIGS. 8A and 8B show the grooves 72 extending through the collector 40 between the edge 68 and the raceway 74. The clearance 73 between the shaft 34 and inner surface of the collector 40 can be clearly seen.

Figure 9:
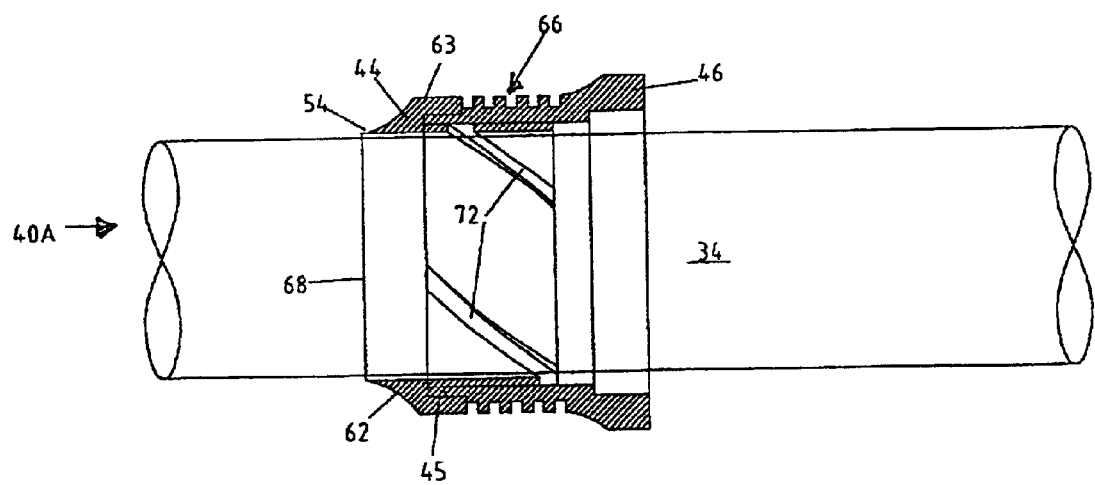
FIG. 9 is a cross sectional side view of another embodiment of a collector in accordance with the present invention.

FIG. 9 shows an alternative form of the collector 40A which includes a bladed portion 44 and a clean fluid exit portion 44. These are shown coupled together.

Figures 10A, 10B:
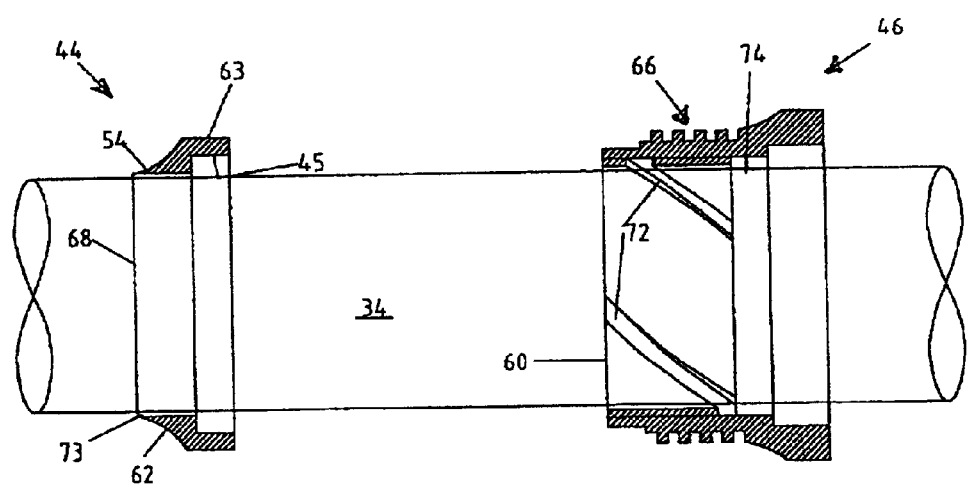
FIG. 10A is a cross sectional side view of a bladed portion of the collector of FIG. 9.
FIG. 10B is a cross sectional side view of a clean fluid exit portion of the collector of FIG. 9.

FIG. 10A shows the bladed portion 44, which includes the blade 54 that encircles the shaft 34 by a narrow gap 73. The bladed portion 44 also includes a step 45 for connecting to the clean fluid portion 46. An outer surface 63 of the step extends from the curved surface 62.

FIG. 10B shows the clean fluid exit portion 46, which includes the plurality of grooves 72 that extend from a front 60 of the portion 46 to the raceway 74. The grooves 72 are helical in shape so as to sweep the fluid therethrough. Alternatively they may be straight and parallel with the shaft 34.

Figure 11:
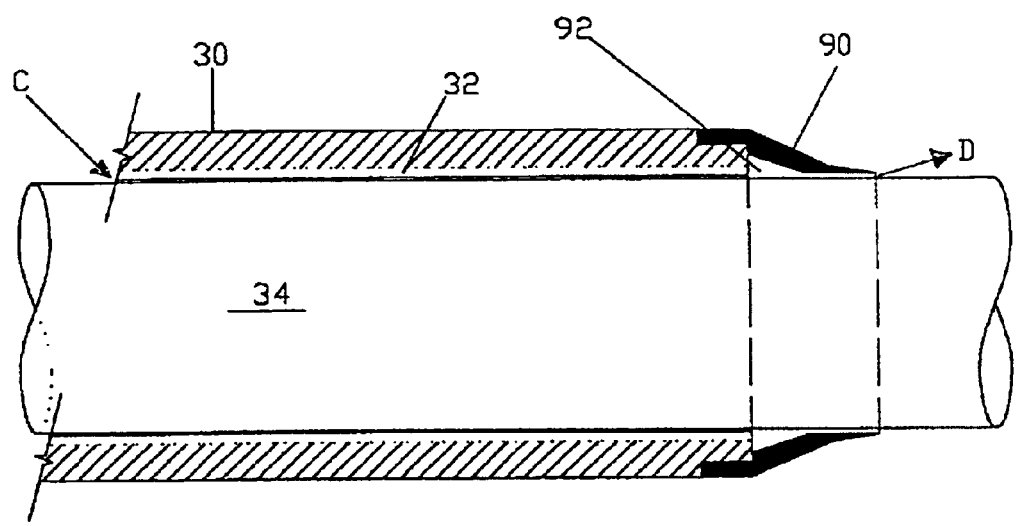
FIG. 11 is a cross sectional side view of a bearing with a rear blade in accordance with the present invention.

FIG. 11 shows the bearing 30 with a rear blade 90. There is a raceway 92 that allows fluid that has passed through the lubricating channels 32 to collect and then exit the bearing as shown by D. The rear blade 90 is useful when the shaft is spinning in reverse. Due to the narrow opening between the blade and the shaft 34, it will act as a simple sieve discouraging particles to travel the wrong way into lubricating grooves 32.

The method of use and operation of the present invention will now be described with reference to the accompanying drawings.

A marine craft is propelled forward by propeller 36 mounted on the propeller drive shaft 34. In the first embodiment, the forward motion causes a slurry of water and sand and possibly other particles to enter the inlet 14 as shown by arrows A. In the second embodiment the helical shape of the channel draws the water and particles into the inlet 14. Large particles are prevented from entering the raceway by the projection 50.

When the slurry of water and particles enters the cavity 18 either the veins 20 or the helical shaped channels cause the slurry to spin with the rotation of the shaft 34. The slurry continues to move along the length of the separator 10 either by forward motion, venturi effect described below or the helical shape. As the slurry moves along the length of the separator the widening of the cavity presents an increasing area to the slurry. This causes the flow of the slurry to slow. At the same time, the slurry is orbiting the shaft. Due to the orbiting motion, a centrifugal force acts upon the particles causing them to move closer to the sleeve than the water. This may be more pronounced in the second embodiment where the length of the cavity 18 is greater than the distance between the inlet and outlet due to its helical shape.

The particles move along the inside surface of the sleeve until they reach the outlet 16. Movement of the sand particles may be assisted by the sloping of the inside of the sleeve. In the second and third embodiments, the blade 54 provides a physical partition between the inner "clean" water and the outer slurry. The particles are ejected from the separator as shown by arrow B. Some of the separated clean water may enter the lubricating grooves 32 of the bearing 30 at C. The remainder of the water will also exit the separator with the sand at B. The ejection of the particles and water may cause a venturi effect which causes the slurry to be sucked into and through the cavity 18. Once the water entering the bearing has passed through the bearing grooves 32 it exits at D.

The bearing may be provided with a collector 40 in the form of a projection 42 that projects a short distance into the separator as shown in FIG. 1. This is thought to assist in the uptake of the separated water into the bearing and also assist in the ejection of the sand particles and corresponding venturi effect. The collector 40 also acts as a partition. The blade 54 in FIG. 3 may be considered a more somewhat sophisticated form of this. The collector in the third embodiment is an even more sophisticated form of partition.

An escape passage between the collector 40 and the extension 20 leads from the outlet chamber 17 to the ejection slit 19. Within the escape passage there is a turbulence means in the form of a series of circumferencial grooves 66 in the outer surface of collector 40. These grooves 66 create turbulence in the slurry of particles and remaining fluid. The turbulence slows down the slurry flow so that the venturi effect of the ejected particles does not create a suction strong enough to draw fluid in through the bearing 34. In addition, the turbulence reduces the possibility of particles becoming trapped. After the grooves 66 is an exit chute 64 that opens to the exterior of the separator 10C and forms the ejection slit 19.

It will be clear to those skilled in the art that the present invention has at least the advantage of reducing the occurrence of said entering the lubricating grooves of the bearing, thereby reducing the wear on the bearing.

Modifications and variations will be apparent to those skilled in the art, such as the number of views, the length of each vein or the number of helical channels may vary; the length of the separator may vary provided that the slurry is caused to orbit the shaft and thus introduce the centrifugal separating effect on the sand particles or the form and complexity of portion may also vary. It is envisaged that the separator may find application other than for minimising the amount of abrasive particles entering the lubricating grooves of a propeller shaft bearing. Such other applications may require further modifications. Such modifications and variations are intended to be within the scope of the present invention, the nature of which is to be determined from the foregoing description.

What is claimed is:

1. A separator for separating particles entrained in a fluid, said separator including:
    a sleeve adapted to be mounted over a rotatable shaft for forming a cavity therebetween;
    an inlet to the cavity through which a slurry of fluid and particles may enter the cavity in use;
    a device for imparting a centrifugal force on fluid within the cavity, said device operatively connected to the shaft so that, in use, spinning of the shaft creates the centrifugal force which separates the fluid into an inner layer substantially devoid of particles and an outer layer carrying the particles;
    a partition arranged to part the inner layer of fluid substantially devoid of particles from the outer layer of fluid carrying particles; and
    a first outlet from the cavity for allowing the outer layer to exit the cavity and a second outlet for the cavity for allowing the inner layer to exit the cavity.

2. A separator according to claim 1, wherein the cavity increases in cross-sectional area along its length from the inlet towards the outlets.

3. A separator according to claim 1, wherein the sleeve is frustoconical in shape with the narrow end of the cone at the inlet and a wide end of the outlet, whereby the size of the cavity increases along is length from the inlet to the outlets.

4. A separator according to claim 1, wherein said device is in the form of one or more paddles projecting from the shaft into the cavity.

5. A separator according to claim 1, wherein in the cavity is of a helical shape.

6. A separator according to claim 5, wherein said helical shape of the cavity acts as said device for imparting centrifugal force.

7. A separator according to claim 1, wherein the outlet includes a chamber at the outlet of the cavity between the sleeve and the shaft, the chamber arranged to receive the partition.

8. A separator according to claim 1, wherein the partition is in the form of a blade closely encircling the shaft.

9. A separator according to claim 1, wherein the sleeve is arranged to rotate about its axis relative to the partition.

10. A separator according to claim 1, further comprising a turbulence inducer for slowing the exit of fluid carrying particles from the first outlet.

11. A separator according to claim 1, wherein the partition includes a scoop for scooping the inner layer of fluid away from an edge of the partition to the second outlet.

12. A separator according to claim 11, wherein the scoop is in the form of a plurality of channels in the partition.

13. A separator according to claim 12, wherein a first raceway is provided between the inlet and the device for imparting centrifugal force.

14. A separator according to claim 13, wherein a second raceway is provided between the channels in the partition and the second outlet.

15. A separator according to claim 11, wherein the scoop is in the form of a plurality of channels in the parting device.

16. A separator and bearing combination, the separator as defined in claim 1, the bearing arranged to receive fluid substantially devoid of particles from the second outlet of the separator.

17. A separator and bearing combination according to claim 16, wherein the bearing is provided with a sieve means on an opposite side of the bearing to the separator.

18. A separator, parting means and a bearing combination, the separator for separating particles entrained in a fluid, said separator including a sleeve adapted to be mounted over a rotatable shaft for forming a cavity therebetween, an inlet to the cavity through which a slurry of fluid and particles may enter the cavity in use, a device for imparting a centrifugal force on fluid within the cavity, said device operatively connected to the shaft so that, in use, spinning of the shaft creates the centrifugal force which separates the fluid into an inner layer substantially devoid of particles and an outer layer carrying the particles;

the pairing means parts the inner layer of fluid substantially devoid of particles from the outer layer of fluid carrying particles; and a bearing arranged to receive the inner layer of fluid from the parting means.

19. A separator for separating particles entrained in a fluid, said separator including:

a sleeve adapted to be mounted over a rotatable shaft for forming a cavity therebetween;

an inlet to the cavity through which a slurry of fluid and particles may enter the cavity in use;

one or more paddles projecting from the shaft into the cavity so that, in use, spinning of the shaft imparts a centrifugal force on fluid within the cavity, said centrifugal force, in use, separating the fluid so that the particles are caused to move away from the shaft leaving fluid substantially devoid of particles closer to the sleeve than the shaft; and an outlet from the cavity opposite the inlet through which the particles leave the cavity further away from the shaft than fluid substantially devoid of particles leaves the cavity.

20. A separator according to claim 19, wherein the outlet includes a chamber at the outlet of the cavity between the sleeve and the shaft, the chamber arranged to receive a parting device for portioning an inner layer of fluid substantially devoid of the particles from an outlet layer of fluid carrying the particles.

21. A separator according to claim 20, wherein said outlet includes a parting device arranged to portion an inner layer of fluid substantially devoid of the particles from an outer layer of the fluid carrying the particles.

22. A separator according to claim 21, wherein the parting device is in the form of a blade closely encircling the shaft.

23. A separator according to claim 21, wherein the sleeve is arranged to rotate about its axis relative to the parting device.

24. A separator according to claim 21, wherein the outer layer is ejected from a first exit of the outlet.

25. A separator according to claim 24, wherein the first exit includes a turbulence means for slowing the exit of fluid carrying particles from the first exit.

26. A separator according to claim 24, wherein the parting device includes a scoop for scooping the inner layer of fluid away from an edge of the parting device to a second exit of the outlet.

27. A separator and bearing combination, the separator as defined in claim 20, the bearing arranged to receive fluid substantially devoid of particles from close to the shaft from the outlet of the separator.

28. A separator for separating particles entrained in a fluid, said separator including:

a sleeve adapted to be mounted over a rotatable shaft for forming a cavity therebetween;

an inlet to a helically shaped cavity through which a slurry of fluid and particles may enter the cavity in use;

a device for imparting a centrifugal force on fluid within the cavity, said device operatively connected to the shaft so that, in use, spinning of the shaft creates the centrifugal force, of fluid within the cavity, said centrifugal force, in use, separating the fluid so that the particles are caused to move away from the shaft leaving fluid substantially devoid of particles be closer to the sleeve than the shaft; and an outlet from the cavity opposite the inlet through which the particles leave the cavity further away from the shaft than fluid substantially devoid of particles leaves the cavity.

29. A separator according to claim 28, wherein said helical shape of the cavity acts as said device for imparting centrifugal force.

30. A separator according to claim 28, wherein the outlet includes a chamber at the outlet of the cavity between the sleeve and the shaft, the chamber arranged to receive a parting device for portioning an inner layer of fluid substantially devoid of the particles from an outlet layer of fluid carrying the particles.

31. A separator according to claim 30, wherein said outlet includes the parting device arranged to portion an inner layer of fluid substantially devoid of the particles from an outer layer of the fluid carrying the particles.

* * * * *